United States Patent
Yoshino et al.

(10) Patent No.: US 8,077,221 B2
(45) Date of Patent: Dec. 13, 2011

(54) IMAGE CAPTURING APPARATUS AND CONTROL METHOD THEREFOR WITH DETERMINATION WHETHER STORAGE MEDIUM IS LIMITED-REWRITEABLE STORAGE MEDIUM

(75) Inventors: Eiji Yoshino, Kawasaki (JP); Yohei Fujitani, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 841 days.

(21) Appl. No.: 12/092,348

(22) PCT Filed: Aug. 31, 2007

(86) PCT No.: PCT/JP2007/067462
§ 371 (c)(1),
(2), (4) Date: May 1, 2008

(87) PCT Pub. No.: WO2008/029902
PCT Pub. Date: Mar. 13, 2008

(65) Prior Publication Data
US 2009/0290044 A1 Nov. 26, 2009

(30) Foreign Application Priority Data
Sep. 5, 2006 (JP) ................................. 2006-240795

(51) Int. Cl.
*H04N 5/76* (2006.01)
(52) U.S. Cl. .................................................. 348/231.2
(58) Field of Classification Search ................ 348/231.8, 348/231.1, 231.2
See application file for complete search history.

(56) References Cited

U.S. PATENT DOCUMENTS

| | | | |
|---|---|---|---|
| 6,584,541 B2 * | 6/2003 | Friedman et al. | 711/103 |
| 6,675,276 B2 * | 1/2004 | Schulze et al. | 711/200 |
| 6,857,054 B2 * | 2/2005 | Minne | 711/163 |
| 7,003,619 B1 * | 2/2006 | Moore et al. | 711/102 |
| 7,039,780 B2 * | 5/2006 | Taussig et al. | 711/165 |
| 7,412,558 B2 * | 8/2008 | Oribe et al. | 711/103 |
| 7,486,314 B2 * | 2/2009 | Shibutani | 348/231.7 |
| 7,730,270 B2 * | 6/2010 | Dunlop et al. | 711/161 |
| 7,861,058 B2 * | 12/2010 | Moore et al. | 711/206 |
| 2002/0184459 A1 * | 12/2002 | Taussig et al. | 711/165 |
| 2003/0120858 A1 * | 6/2003 | March et al. | 711/103 |
| 2004/0003191 A1 * | 1/2004 | Minne | 711/163 |
| 2004/0196388 A1 * | 10/2004 | Kaku | 348/231.7 |
| 2005/0151858 A1 * | 7/2005 | Nozaki et al. | 348/231.9 |
| 2005/0174443 A1 | 8/2005 | Niimura et al. | 348/231.2 |
| 2007/0030358 A1 * | 2/2007 | Aoyama | 348/231.2 |
| 2008/0244203 A1 * | 10/2008 | Gorobets et al. | 711/161 |

FOREIGN PATENT DOCUMENTS

| | | |
|---|---|---|
| JP | 8-77286 | 3/1996 |
| JP | 2003-244606 | 8/2003 |
| JP | 2004-259138 | 9/2004 |
| JP | 2005-260920 | 9/2005 |
| JP | 2005-333175 | 12/2005 |

* cited by examiner

Primary Examiner — Jason Chan
Assistant Examiner — Gary C Vieaux
(74) Attorney, Agent, or Firm — Fitzpatrick, Cella, Harper & Scinto

(57) ABSTRACT

An image capturing apparatus using a limited-rewriteable storage medium is disclosed. The image capturing apparatus writes generated image data in the limited-rewriteable storage medium at the time of shooting processing. On the other hand, an internal memory in the image capturing apparatus holds management information such as a FAT and directory entry. The apparatus writes the management information in the limited-rewriteable storage medium after the contents of the information are determined.

5 Claims, 12 Drawing Sheets

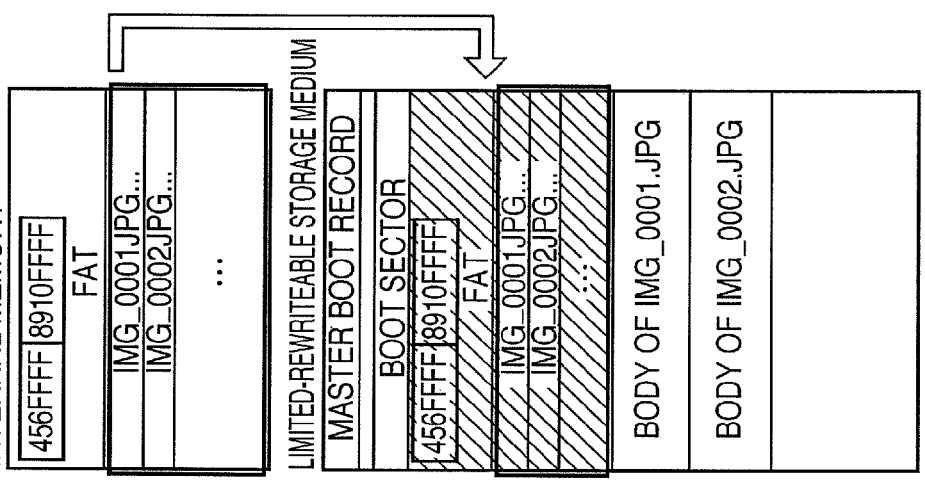
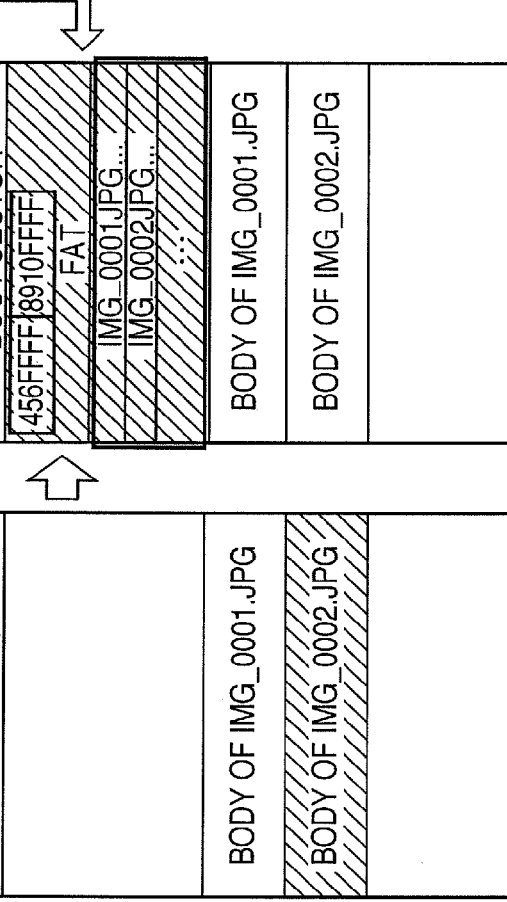
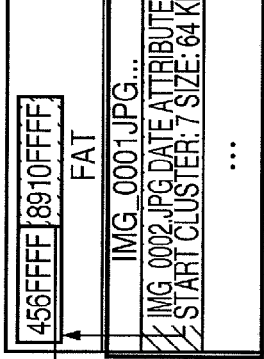
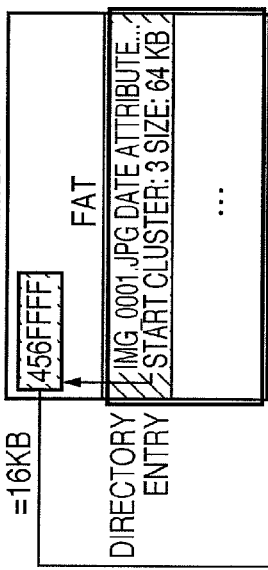
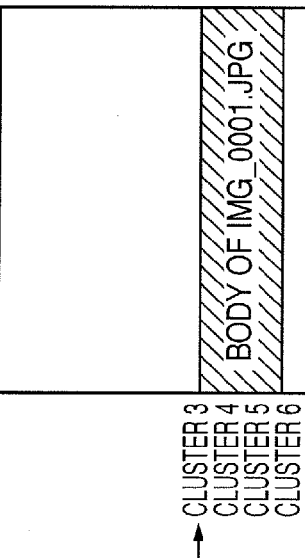

IMAGE CAPTURING APPARATUS AND CONTROL METHOD THEREFOR WITH DETERMINATION WHETHER STORAGE MEDIUM IS LIMITED-REWRITEABLE STORAGE MEDIUM

TECHNICAL FIELD

The present invention relates to an image capturing apparatus which records videos as digital data, such as a digital camera, and a control method for the apparatus. The present invention relates, more particularly, to an image capturing apparatus which records in a recording medium with a limited number of write accesses and a control method for the apparatus.

BACKGROUND ART

In general, data files are recorded in a storage device in accordance with a rule called a file system for managing the storage locations, attributes, and the like of the data files. Although various kinds of file systems have been known in accordance with the types of OSs and the like, the FAT (File Allocation Table) file system is widely used.

FIG. 2 shows an outline of the area arrangement of a storage device using the FAT system. A management area is set in the head area. The management area comprises a master boot record (MBR), boot sector, FAT, and directory. The management area records basic information concerning the file system, for example, the size of the data area in the storage device and a cluster size representing the minimum logical storage unit in the storage device. The data area follows the management area. In general, data files are saved in the data area.

The most basic procedure for acquiring a data file (IMG_0001.JPG) recorded in the data area will be described below. The file input/output module included in, for example, the OS finds a directory entry block in the storage device first. The file input/output module then searches for IMG_0001.JPG by a file name in the directory entry. Upon finding the directory entry of IMG_0001.JPG, the file input/output module acquires its start cluster.

The file input/output module then refers to an address in the FAT which corresponds to the acquired start cluster and grasps in which chain of clusters (cluster chain) the data file is recorded.

Referring to FIG. 2, it is known from the directory entry that the start cluster of IMG_0001.JPG is cluster 3. Referring to a FAT area corresponding to cluster 3 makes it obvious that "4" is recorded, and file data is also recorded in cluster 4. Referring to a FAT area corresponding to cluster 4 makes it obvious that "5" is recorded. In this manner, the chain of clusters in which the data file is recorded is traced back to the cluster in which "FFFF" is recorded, which indicates the last cluster.

In this case, since "FFFF" is recorded in a FAT area corresponding to cluster 6, it is obvious that IMG_0001.JPG is recorded by using four clusters 3, 4, 5, and 6. In addition, a capacity per cluster allows the size of an area which IMG_0001.JPG uses to be known. That is, if the capacity is 16 KB/cluster, IMG_0001.JPG uses an area with 16 KB*4=64 KB. The file input/output module recognizes in this manner that IMG_0001.JPG exists in clusters 3 to 6, and can acquire the file by reading data from the clusters.

A procedure for saving a new file IMG_0002.JPG in the storage medium will be described next. When newly saving the file, the file input/output module opens the file first. When opening the file, the file input/output module registers a new entry corresponding to the file name (IMG_0002.JPG) in the directory entry area. Note that at this point in time, since the start cluster of the file and the file size are undecided, the directory entry is blank.

The file input/output module then writes the file in blank clusters in the data area. Upon completely writing the data, the file input/output module closes the file. When closing the file, the file input/output module writes a start cluster and a file size in the directory entry, and writes a cluster chain in the FAT area.

As described above, when saving a file, the file input/output module performs at least four writes, that is, a write in a directory entry (at the time of file opening), a write in a data area, and writes in a directory entry and a FAT (at the time of file closing).

Recently, for the purpose of a reduction in the cost of an exchangeable storage medium used for digital cameras and the like, there have been provided storage media with limited numbers of write accesses, for example, write-once storage media. A storage medium with a limited number of write accesses, a write-once storage medium in this case, will be referred to as a limited-rewriteable storage medium.

It is possible to use the FAT file system for a limited-rewriteable storage medium. However, a limited-rewriteable storage medium does not allow updating data within the same writing unit (sector). For this reason, when saving a file in a limited-rewriteable storage medium, it is impossible to use the method described with reference to FIG. 2, without any change, which needs to update a FAT and directory entry within the same sector.

Under the circumstance, a file save procedure for the application of the FAT file system to a limited-rewriteable storage medium has been proposed.

This method will be described with reference to FIG. 3. The method is the same as the above method in that it is necessary to write in a FAT, directory entry, and data area when saving the new file IMG_0002.JPG in a limited-rewriteable storage medium.

Although it suffices to write in available clusters in the data area, management information (the FAT and the directory entry) has already been written. As described above, a limited-rewriteable storage medium which allows a write access only once does not allow once-written data to be overwritten/updated. For this reason, the FAT and directory entry area which have been used are invalidated, and new management information to which information concerning IMG_0002.JPG is added is written in an unused area. In addition, all information including a data size and a start cluster is written in the directory entry at once after a write in the data area instead of at the time of file opening.

This makes it possible to record a file in a limited-rewriteable storage medium based on the FAT file system. However, saving a new file will always consume a capacity for management information other than a data area.

For example, Japanese Patent Laid-Open No. 2003-244606 (D1) has proposed a technique of recording management information in a built-in nonvolatile memory in a camera, together with image data, and recording the image data and the management information in a limited-rewriteable storage medium at once at the timing, for example, when a memory card is ejected.

According to D1, since management information is not written every time a file is created, it is possible to improve the efficiency of use of the limited-rewriteable storage medium. According to D1, however, since both image data and management information are stored in the built-in nonvolatile memory of the camera, if the capacity of the nonvolatile memory is not large, the number of writes in the limited-rewriteable storage medium increases, resulting in a deterioration in the efficiency of use of the storage medium. Recent digital cameras generate large-capacity image data due to an increase in the number of pixels. Therefore, the efficiency of use of a storage medium cannot be effectively improved unless it has a built-in nonvolatile memory with a considerably large capacity. This can cause a large increase in cost.

In addition, the technique disclosed in D1 writes image data when a memory card is ejected or an external device is connected. Therefore, there is a wait time for the next processing until the end of the write. Even if, for example, the user wants to immediately exchange memory cards, he/she must wait until the end of the writing of image data stored in the built-in memory.

On the other hand, in an image capturing apparatus, in order to determine the number of recordable images, it is necessary to know the available space of a storage medium. A unique problem accompanies the use of a limited-rewriteable storage medium. Conventionally, an image capturing apparatus obtains the number of available clusters from the information of the FAT area in a storage medium at the time of startup processing, and calculates the available space of the storage medium by multiplying the obtained number by a cluster size. This apparatus then obtains the number of recordable images based on this available space.

A limited-rewriteable storage medium is configured to allow an image capturing apparatus to use it in the same manner as a general storage medium. For this reason, when an image capturing apparatus uses a limited-rewriteable storage medium, even if the capacity decreases by a capacity corresponding to management information in addition to a capacity corresponding to image data in reality, the apparatus updates the available space upon simply detecting that the capacity has decreased by only the capacity corresponding to the image data.

As a result, a difference appears between the available space calculated by the image capturing apparatus and the actual available space. However, there has been provided no specific method of allowing an image capturing apparatus to accurately grasp the available space of a limited-rewriteable storage medium.

DISCLOSURE OF INVENTION

The present invention therefore provides an image capturing apparatus which can effectively use the capacity of a limited-rewriteable storage medium while improving ease of use and suppressing an increase in cost and a control method for the apparatus.

In addition, the present invention provides an image capturing apparatus which can accurately grasp the available space of a limited-rewriteable storage medium and a control method for the apparatus.

According to an aspect of the present invention, there is provided an image capturing apparatus which has a plurality of operation modes including a shooting mode, comprising: holder unit which allows a storage medium to be attached/detached; discrimination unit adapted to discriminate whether a storage medium attached to the holder unit is a limited-rewriteable storage medium; built-in storage unit which is rewritable; and write control unit adapted to, when the discrimination unit determines that the storage medium is a limited-rewriteable storage medium, perform control to write image data generated by shooting processing in the shooting mode in the storage medium, while temporarily saving management information for the image data in the built-in storage unit and writing the management information in the storage medium at the end of the shooting mode.

According to another aspect of the present invention, there is provided an image capturing apparatus, comprising: holder unit which allows a storage medium to be attached/detached; discrimination unit adapted to discriminate whether a storage medium attached to the holder unit is a limited-rewriteable storage medium; built-in storage unit which is rewritable; and write control unit adapted to, when the discrimination unit determines that the storage medium is a limited-rewriteable storage medium, perform control to write image data generated by shooting processing in the storage medium, while temporarily saving management information for the image data in the built-in storage unit and writing the management information in the storage medium every time the management information reaches a predetermined data size.

According to further aspect of the present invention, there is provided an image capturing apparatus, comprising: holder unit which allows a storage medium to be attached/detached; discrimination unit adapted to discriminate whether a storage medium attached to the holder unit is a limited-rewriteable storage medium; built-in storage unit which is rewritable; and write control unit adapted to, when the discrimination unit determines that the storage medium is a limited-rewriteable storage medium, perform control to temporarily save data to be written in the storage medium in the built-in storage unit, and write the data in the storage medium every time the data reaches a predetermined data size.

According to still further aspect of the present invention, there is provided a control method for an image capturing apparatus which includes a plurality of operation modes including a shooting mode and comprises holder unit which allows a storage medium to be attached/detached and built-in storage unit which is rewritable, comprising the steps of: discriminating whether a storage medium attached to the holder unit is a limited-rewriteable storage medium; and when it is determined in the discriminating step that the storage medium is a limited-rewriteable storage medium, performing control to write image data generated by shooting processing in the shooting mode in the storage medium, while temporarily saving management information for the image data in the built-in storage unit and writing the management information in the storage medium at the end of the shooting mode.

According to yet further aspect of the present invention, there is provided a control method for an image capturing apparatus which includes a plurality of operation modes including a shooting mode and comprises holder unit which allows a storage medium to be attached/detached and built-in storage unit which is rewritable, comprising the steps of: discriminating whether a storage medium attached to the holder unit is a limited-rewriteable storage medium; and when it is determined in the discriminating step that the storage medium is a limited-rewriteable storage medium, performing control to temporarily save data to be written in the storage medium in the built-in storage unit, and write the data in the storage medium every time the data reaches a predetermined data size.

According to still further aspect of the present invention, there is provided an image capturing apparatus comprising: holder unit which allows a storage medium to be attached/detached; discrimination unit adapted to discriminate whether a storage medium attached to the holder unit is a limited-rewriteable storage medium; available space calculating unit adapted to calculate an available space of the storage medium; and the-number-of-recordable-images calculating unit adapted to calculate the number of recordable images with the available space calculated by the available space calculating unit, wherein the-number-of-recordable-images calculating unit calculates the number of recordable images from an available space calculated by the available space calculating unit, a predetermined image data size, and a predetermined management information data size when the discrimination unit determines that the storage medium is a limited-rewriteable storage medium, and calculates the number of recordable images from an available space calculated by the available space calculating unit and a predetermined image data size when the discrimination unit determines that the storage medium is not a limited-rewriteable storage medium.

According to yet further aspect of the present invention, there is provided a control method for an image capturing apparatus comprising holder unit which allows a storage medium to be attached/detached, comprising the steps of: discriminating whether a storage medium attached to the holder unit is a limited-rewriteable storage medium; calculating an available space of the storage medium; and calculating the number of recordable images with the available space calculated in the available space calculating step, wherein in the-number-of-recordable-images calculating step, the number of recordable images is calculated from an available space calculated in the available space calculating step, a predetermined image data size, and a predetermined management information data size when it is determined in the discriminating step that the storage medium is a limited-rewriteable storage medium, and the number of recordable images is calculated from an available space calculated in the available space calculating step and a predetermined image data size when it is determined in the discriminating step that the storage medium is not a limited-rewriteable storage medium.

Further features of the present invention will become apparent from the following description of exemplary embodiments with reference to the attached drawings.

BRIEF DESCRIPTION OF DRAWINGS

FIGS. 4A to 4C are views schematically showing an outline of a management information update method for a limited-rewriteable storage medium in the first embodiment of the present invention;

BEST MODE FOR CARRYING OUT THE INVENTION

Preferred embodiments of the present invention will now be described in detail in accordance with the accompanying drawings.

(Arrangement of Digital Camera 100)

Figure 1:
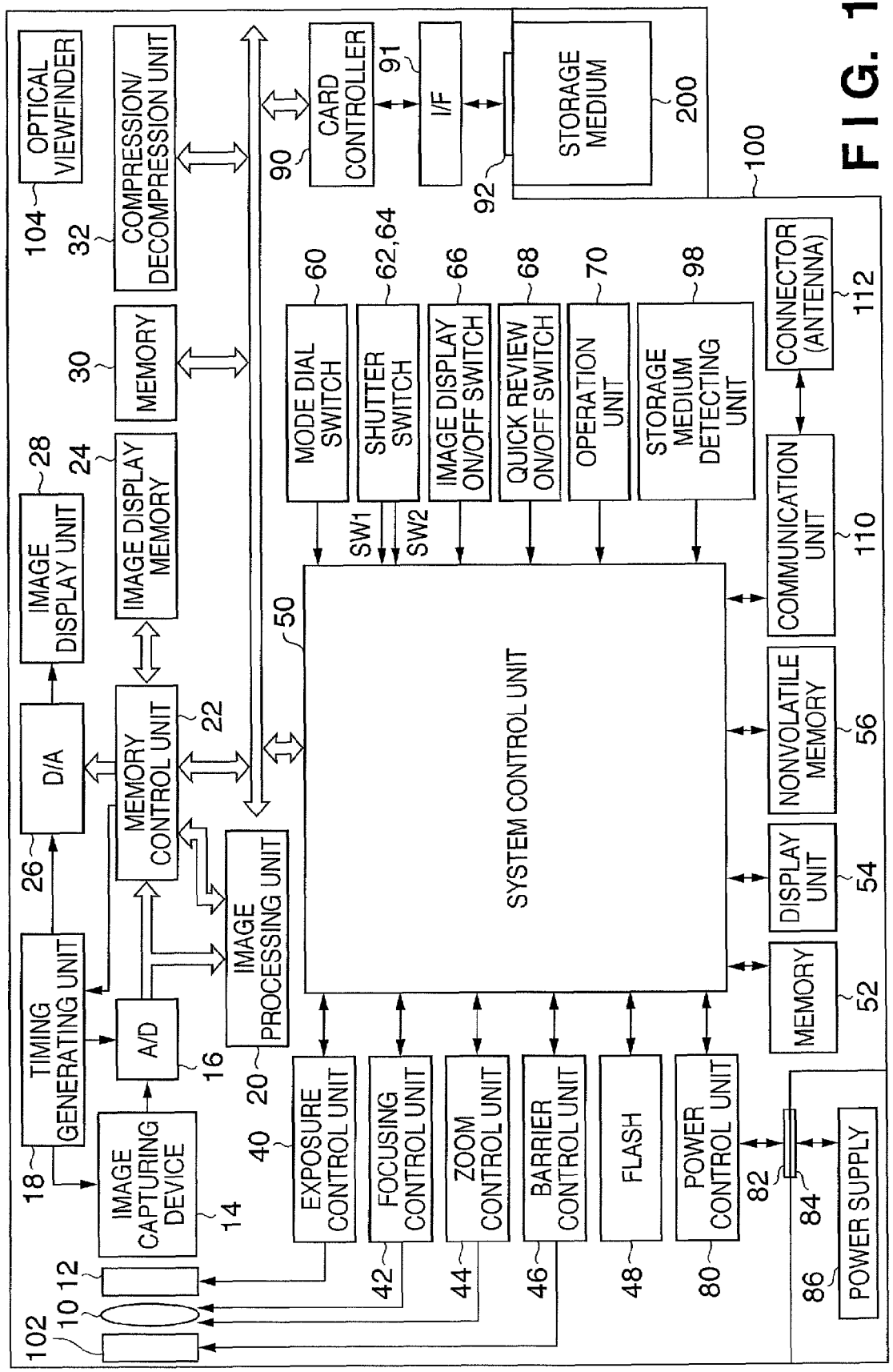
FIG. 1 is a block diagram showing an example of the arrangement of a digital camera 100 as an example of an image capturing apparatus according to an embodiment of the present invention.
Figure 2:
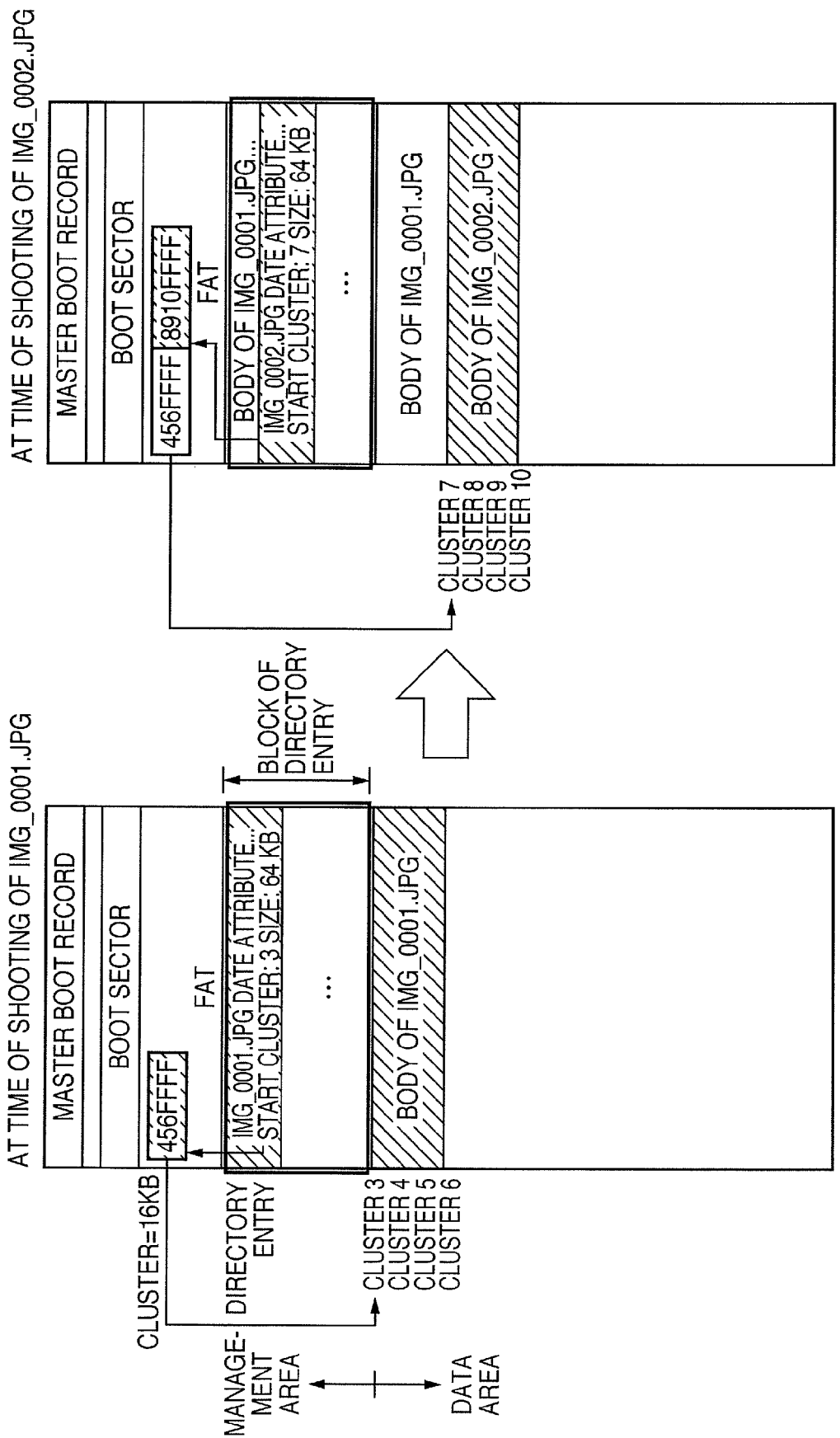
FIG. 2 is a view showing an outline of the area arrangement of a storage device using the FAT system.
Figure 3:
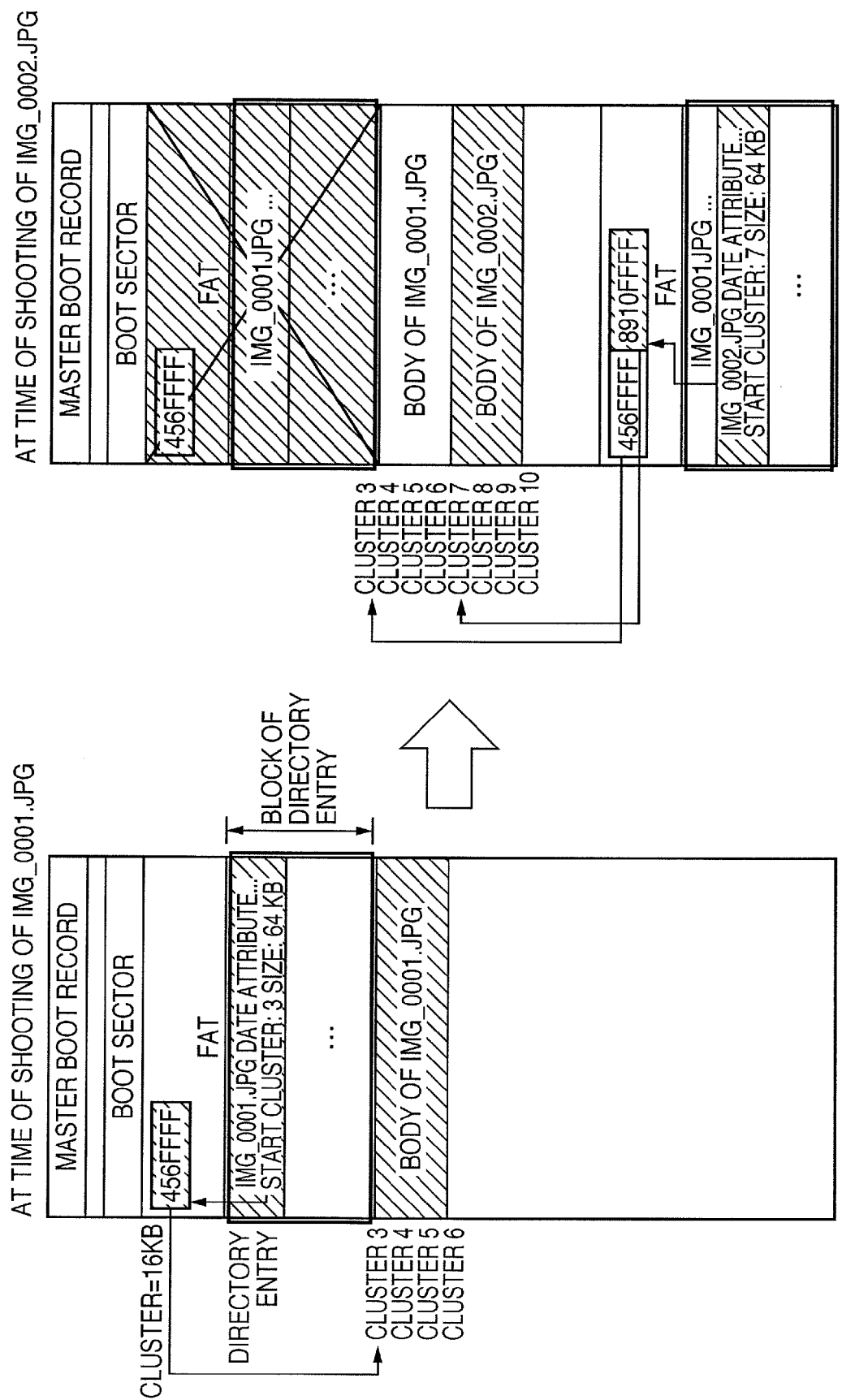
FIG. 3 is a view showing an outline of a file save procedure in a case wherein the FAT file system is applied to a limited-rewriteable storage medium.

FIG. 1 is a block diagram showing an example of the arrangement of a digital camera 100 as an example of an image capturing apparatus according to an embodiment of the present invention. An image capturing apparatus according to this embodiment is not limited to a digital camera, and may be an apparatus which operates as a digital camera. Apparatuses which operate as digital cameras include a digital video camera, a cellular phone with a digital camera, and the like.

Reference numeral 10 denotes a lens unit; 12, a shutter with a stop function; 14, an image capturing device which converts an optical image into an electrical signal; and 16, an A/D converter which converts an analog signal output from the image capturing device 14 into a digital signal. Note that as the image capturing device 14, a CCD image sensor, a CMOS image sensor, or the like can be used.

A timing generating unit 18 supplies clock signals and control signals to the image capturing device 14, the A/D converter 16, and a D/A converter 26, and is controlled by a memory control unit 22 and a system control unit 50.

An image processing unit 20 performs predetermined pixel interpolation processing and color conversion processing for image data from the A/D converter 16 or image data from the memory control unit 22.

The image processing unit 20 performs predetermined arithmetic processing by using captured image data. The system control unit 50 controls an exposure control unit 40 and a focusing control unit 42 based on the obtained arithmetic processing result, thereby implementing AF (Auto Focus) processing, AE (Auto Exposure) processing, and EF (Electronic Flash pre-emission) processing of the TTL (Through The Lens) system.

In addition, the image processing unit 20 performs predetermined arithmetic processing by using captured image data, and performs AWB (Auto White Balance) processing of the TTL system on the basis of the obtained arithmetic processing result.

The memory control unit 22 controls the A/D converter 16, the timing generating unit 18, the image processing unit 20, an image display memory 24, the D/A converter 26, a memory 30, and a compression/decompression unit 32.

Output data from the A/D converter 16 is written in the image display memory 24 or the memory 30 through the image processing unit 20 and the memory control unit 22 or is written in the image display unit 24 or the memory 30 through the memory control unit 22.

An image display unit 28 such as an LCD or organic EL display displays display image data written in the image display memory 24 through the D/A converter 26. Sequentially displaying captured image data on the image display unit 28 makes it possible to implement an electronic viewfinder (EVF) function.

The image display unit 28 can arbitrarily turn on/off display in accordance with an instruction from the system control unit 50. Turning off display makes it possible to greatly reduce the power consumption of the digital camera 100.

The memory 30 is a storage device which stores captured still and moving images, and has a storage capacity large enough to store a predetermined number of still images or a predetermined time period of moving images. For this reason, in the case of continuous shooting, in which a plurality of still images are continuously captured, or in the case of panoramic shooting, it is possible to write an image in the memory 30 at high speed in large volume.

Furthermore, it is possible to use the memory 30 as a work area of the system control unit 50.

The compression/decompression unit 32 imports image data from the memory 30, compresses the image data in accordance with a predetermined image compression method, and writes the compressed image data in the memory 30. In addition, the compression/decompression unit 32 can import compressed image data from the memory 30, decompress the image data, and write the decompressed image data in the memory 30. Note that the compression/decompression unit 32 can use, as the predetermined image compression method, an image compression method defined by JPEG, JPEG 2000, or the like, or an image compression method using adaptive discrete cosine transform (ADCT), Wavelet transformation, or the like.

The exposure control unit 40 controls the shutter 12 with the stop function and also has a flash light control function in cooperation with a flash 48.

The focusing control unit 42 controls focusing of the lens unit 10. A zoom control unit 44 controls zooming of the lens unit 10. A barrier control unit 46 controls the operation of a protection unit 102 serving as a lens barrier which protects the lens unit 10.

The flash 48 has a function as a supplemental light source at the time of shooting, and a light control function. The flash 48 also has a function of emitting AF supplemental light.

The exposure control unit 40 and the focusing control unit 42 are controlled by the TTL system. The system control circuit 50 controls the exposure control unit 40 and the focusing control unit 42 based on the arithmetic processing result obtained by the image processing unit 20.

The system control unit 50 is, for example, a CPU, which controls the overall digital camera 100 by executing programs stored in a memory 52. The memory 52 stores constants, variables, programs, and the like for the operation of the system control unit 50.

A display unit 54 comprises a combination of an LCD, an LED, a speaker, and the like, and displays an operation state, a message, and the like using characters, images, sounds, and the like in accordance with the execution of a program by the system control unit 50. One or a plurality of display units 54 are arranged at easily observable positions near an operation unit 70 of the digital camera 100. Part of the display unit 54 is placed in an optical viewfinder 104.

For example, the following are the display contents of the display unit 54 which are displayed on an LCD or the like: a single shot/continuous shooting mode indication, a self-timer indication, a compression ratio indication, an indication of the number of recording pixels, an indication of the number of recorded images, an indication of the number of remaining recordable images, a shutter speed indication, an aperture value indication, an exposure correction indication, a flash indication, a red-eye reduction indication, a macro shooting indication, a buzzer setting indication, a remaining timepiece battery level indication, a remaining battery level indication, an error indication, an information indication by a number composed of a plurality of digits, an indication of the attachment or detachment state of the recording media 200, a communication I/F operation indication, and a date and time indication. Some of these indications are also displayed in the optical viewfinder 104.

In addition, of the display contents of the display unit 54, the indications displayed in the optical viewfinder 104 include an in-focus indication, a camera shake warning indication, a flash charge indication, a shutter speed indication, an aperture value indication, an exposure correction indication, and the like.

A nonvolatile memory 56 is a memory that is electrically erasable/recordable, and an EEPROM or the like is used as the nonvolatile memory 56.

The digital camera 100 comprises a mode dial switch 60, a first shutter switch SW1 62, a second shutter switch SW2 64, an image display ON/OFF switch 66, a quick review ON/OFF switch 68, and the operation unit 70. They are operation members for giving instructions to, for example, start and stop the predetermined operations of the system control unit 50. Each of these operation members comprises a button, a switch, a dial, a touch panel, a line-of-sight detection device, a speech recognition device, or the like or a combination thereof.

Each of these operation members will be concretely described below.

The mode dial switch 60 allows switching/setting of operation modes, for example, an automatic shooting mode, program shooting mode, panoramic shooting mode, playback mode, multi-screen playback/erase mode, and PC connection mode.

The first shutter switch SW1 62 is turned on when a shutter button (not shown) provided on the digital camera 100 is pressed to the first stroke (pressed halfway). Turning on the first shutter switch SW1 62 will start AF (Auto Focus) processing, AE (Auto Exposure) processing, AWB (Auto White Balance) processing, EF processing, and the like.

The second shutter switch SW2 64 is turned on when the shutter button provided on the digital camera 100 is pressed to the second stroke (fully pressed). This gives an instruction to start a series of processing comprising exposure processing, development processing, and recording processing. In exposure processing, this apparatus writes a signal read from the image capturing device 14, as image data, in the memory 30 through the A/D converter 16 and the memory control unit 22. In addition, the apparatus performs development processing using arithmetic processing in the image processing unit 20 and the memory control unit 22. Furthermore, the apparatus performs the recording processing of reading the image data from the memory 30, compressing the data in the compression/decompression unit 32, and writing the image data in the recording medium 200.

Using the image display ON/OFF switch 66 makes it possible to perform ON/OFF setting for the image display unit 28. In shooting operation using the optical viewfinder 104, turning off the image display unit 28 can save power.

With the quick review ON/OFF switch 68, the user sets whether to perform the quick review operation of automatically playing back captured image data immediately after shooting. Note that in this embodiment, the user sets execution/nonexecution of quick review while the image display unit 28 is OFF.

The operation unit 70 is a user interface including operation members such as switches, buttons, a rotating dial switch, a touch panel, and the like.

The operation unit 70 includes a menu button, a set button, a macro button, a multi-screen playback/new page button, a flash setting button, a single shot/continuous shooting/self-timer switching button, a menu movement + (plus) button, a menu movement − (minus) button, a playback image movement + (plus) button, a playback image movement − (minus) button, a captured image quality selection button, an exposure correction button, a date and time setting button, and the like.

A power control unit 80 comprises a battery detection circuit, a DC/DC converter, a switch circuit which switches blocks to be energized, and the like. The power control unit 80 detects the attachment/detachment of a battery, the type of battery, and a remaining battery level, and controls the DC/DC converter based on the detection result and an instruction from the system control circuit 50, thereby applying a necessary voltage to each unit including a recording medium 200 for a necessary period of time.

A power supply 86 comprises a primary battery, such as an alkaline battery or a lithium battery, a secondary battery such as an NiCd battery, an NiMH battery, or an Li battery, an AC adaptor, and the like, and is mounted in the digital camera 100 through connectors 82 and 84.

A card controller 90 transmits/receives data to/from the storage medium 200 through an interface 91. The storage medium 200 connects to the interface 91 through a connector 92. A storage medium detecting unit 98 detects whether the storage medium 200 is connected to the connector 92.

The storage medium 200 is a detachable storage medium. As the storage medium 200, a memory card, a removable HDD, or the like can be used.

Note that this apparatus may be configured to allow the use of a plurality of storage media 200. In this case, two or more pairs of interfaces 91 and connectors 92 connect to the card controller 90. The specifications of the storage media 200 may be the same or different from each other.

In addition, devices which connect to the interface 91 are not limited to the storage medium 200. For example, various types of communication cards can connect to the interface 91, which include a LAN card, a modem card, a USB card, an IEEE1394 card, a P1284 card, a SCSI card, and a communication card for PHS or the like. In this case, it is possible to transfer image data and management information attached to image data to/from other computers and peripheral devices such as printers through communication cards.

The protection unit 102 covers the image capturing unit including the lens unit 10 of the digital camera 100 to prevent the image capturing unit from being contaminated and damaged.

The optical viewfinder 104 is, for example, a TTL viewfinder, and forms a light beam passing through the lens unit 10 into an image by using a prism and a mirror. Using the optical viewfinder 104 makes it possible to perform shooting without using the electronic viewfinder function of the image display unit 28. As described above, information associated with some of the functions displayed on the display unit 54 are displayed in the optical viewfinder 104. For example, the information includes an in-focus indication, a camera shake warning indication, a flash charge indication, a shutter speed indication, an aperture value indication, an exposure correction indication, and the like.

A communication unit 110 performs various types of communication processing such as RS232C, USB, IEEE1394, P1284, SCSI, modem, LAN, and wireless communication.

A connector (an antenna in a case of wireless communication) 112 is used to connect the digital camera 100 to another device through the communication unit 110.

A method of updating the management information in a limited-rewriteable storage medium in the digital camera 100 having this arrangement will be described next with reference to FIGS. 4A to 4C and 5.

FIGS. 4A to 4C are views schematically showing an outline of the method of updating the management information in the limited-rewriteable storage medium in this embodiment.

Figure 5:
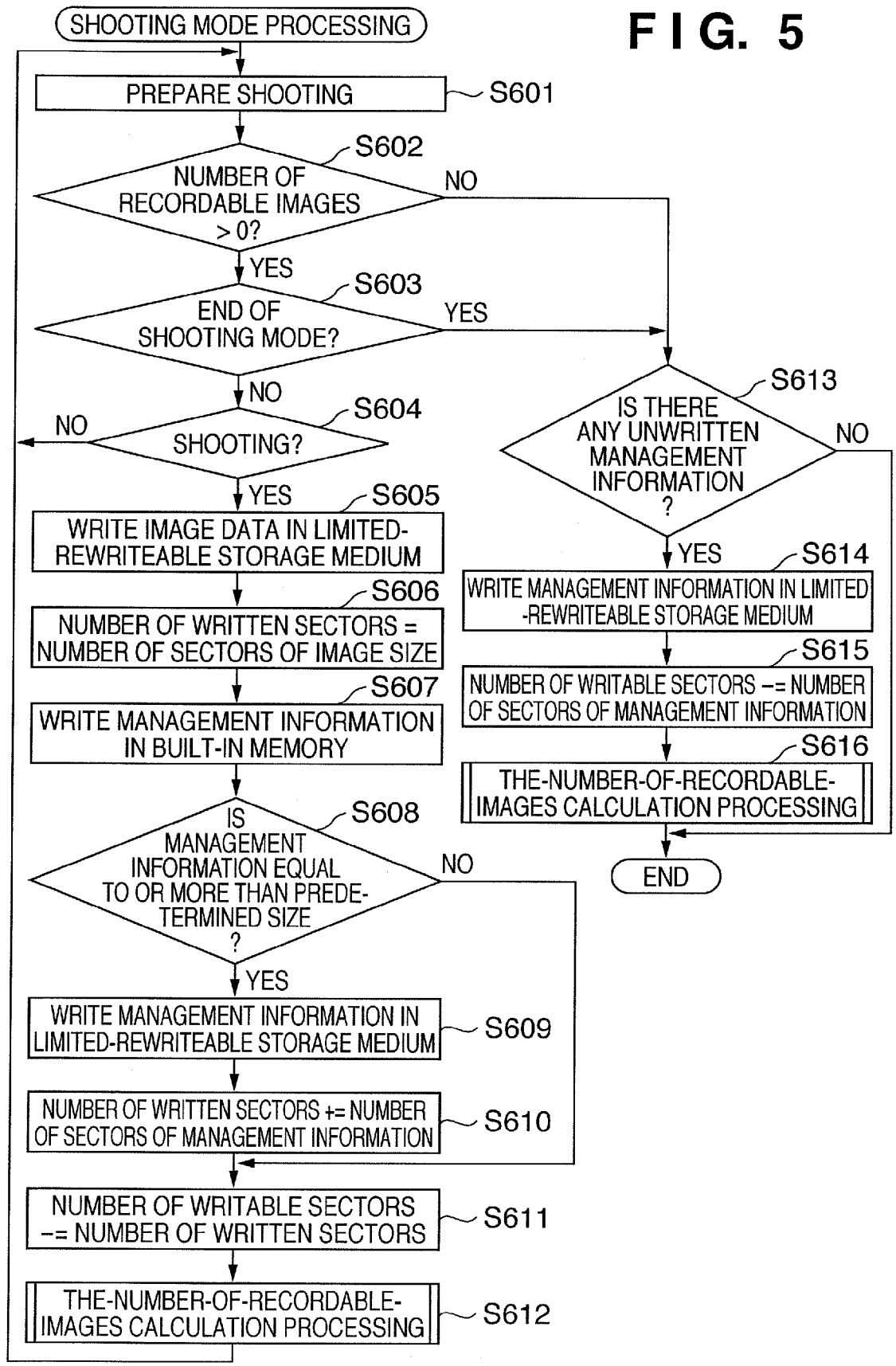
FIG. 5 is a flowchart for explaining the management information update method for the limited-rewriteable storage medium in the first embodiment of the present invention.

FIG. 5 is a flowchart for explaining management information update processing in the limited-rewriteable storage medium in this embodiment.

For the sake of simplicity, assume that the system control unit 50 has already detected that the storage medium 200 is a limited-rewriteable storage medium. A method of detecting the type of storage medium is not specifically limited. For example, it suffices to use mechanical detection methods or electrical detection methods. The former methods include a method of mechanically detecting the shape of a specific portion of the package of the limited-rewriteable storage medium. The latter methods include a method of performing detection by acquiring the attribute information of a storage medium which is stored in advance.

When a shooting mode (a mode of performing shooting, e.g., an automatic shooting mode, program shooting mode, or panoramic shooting mode) is set by operating the mode dial switch 60, the system control unit 50 performs shooting preparation processing (S601).

In step S602, the system control unit 50 checks whether the number of recordable images is one or more. The number of writable sectors and the number of recordable images of the storage medium 200 have already been calculated by a startup processing procedure to be described later. If the remaining capacity of the storage medium 200 is small and the number of recordable images is 0, the system control unit 50 advances to step S613 without permitting shooting.

Upon determining in step S602 that the number of recordable images is one or more, the system control unit 50 receives an input from the operation unit 70 and determines whether the input is for finishing the shooting mode (S603). In this case, an input for finishing the shooting mode is, for example, in particular an instruction to shift to the playback mode through the mode dial switch 60 or a shutdown (power OFF) instruction based on the operation of the power switch. In addition, this input includes an input irrelevant to the operation by the user, for example, a notification of abnormality such as automatic shutdown by the system control unit 50.

When finishing the shooting mode, the system control unit 50 advances the process to step S613. When not finishing the shooting mode, the system control unit 50 receives an input from the shutter switch SW1 62 or the second shutter switch SW2 64 and determines whether a shooting instruction is input (S604). Upon determining in step S604 that no shooting instruction is input, the system control unit 50 returns the process to step S601.

If a shooting instruction is input in step S604, that is, the second shutter switch SW2 64 is turned on, the system control unit 50 performs known shooting processing. The system control unit 50 then writes the obtained image data in the limited-rewriteable storage medium 200 through the card controller 90 (S605). The system control unit 50 also sets the number of written sectors to the number of sectors used for the written image data (S606). It is possible to obtain the number of sectors from the image data size and the sector size.

This number of sectors corresponds to the capacity used by image data in the storage medium 200.

The system control unit 50 writes management information such as a FAT and a directory entry in a rewritable internal memory such as the nonvolatile memory 56 or the memory 52 instead of the limited-rewriteable storage medium 200. In this case, if management information has already been written, the system control unit 50 updates the contents of the information (S607). FIG. 4A shows the states of the internal memory and storage medium 200 at the end of shooting processing of the first image (IMG_0001.JPG). FIG. 4B shows the states of the internal memory and storage medium 200 at the end of shooting processing of the second image (IMG_0002.JPG).

The system control unit 50 then determines whether the size of management information written in the internal memory is equal to or more than a predetermined size (S608). In this case, the predetermined size may be the minimum writing unit (e.g., a sector) for the limited-rewriteable storage medium or the buffer size ensured for the internal memory.

Upon determining in step S608 that the management information is less than the predetermined size, the system control unit 50 advances the process to step S611. Upon determining in step S608 that the management information is equal to or more than the predetermined size, the system control unit 50 writes management information corresponding to the predetermined size in the limited-rewriteable storage medium (S609). The system control unit 50 then adds the number of sectors used by the management information written in step S609 to the number of written sectors (S610). FIG. 4C shows the states of the internal memory and storage medium 200 when management information is written.

The system control unit 50 subtracts the calculated number of written sectors from the current number of writable sectors (S611). The system control unit 50 then performs the-number-of-recordable-images calculation processing (FIG. 10) (S612) (to be described later), and returns the process to step S601.

In step S613, the system control unit 50 determines whether there is any management information which has not been written in the limited-rewriteable storage medium 200. If there is unwritten management information, the system control unit 50 writes the management information stored in the internal memory in a predetermined area of the limited-rewriteable storage medium 200 (S614). The system control unit 50 then subtracts the number of sectors used by the management information written in step S614 from the current number of writable sectors (S615).

Finally, the system control unit 50 performs the-number-of-recordable-images calculation processing (FIG. 10) (to be described later) (S616), and finishes the shooting mode. Upon determining in step S613 that there is no unwritten management information, the system control unit 50 immediately finishes the shooting mode and performs processing in accordance with the input detected in step S603, for example, a shift to the playback mode or shutdown.

As described above, according to this embodiment, this apparatus writes newly generated image data in the limited-rewriteable storage medium 200. On the other hand, the internal memory holds the management information while there is a possibility that it is updated. Of the management information, a portion whose contents are determined is written in the limited-rewriteable storage medium first. This makes it possible to efficiently use the capacity of the limited-rewriteable storage medium 200.

In addition, since the management information is sufficiently smaller in size than the image data, the capacity of the built-in memory which is required to temporarily store the management information is small, and it is not generally necessary to increase the capacity of the built-in memory. When writing determined management information, in particular, this apparatus writes information for each data amount equal to the writing unit of the limited-rewriteable storage medium 200, thereby further efficiently using the storage capacity of the limited-rewriteable storage medium 200.

Figure 6:
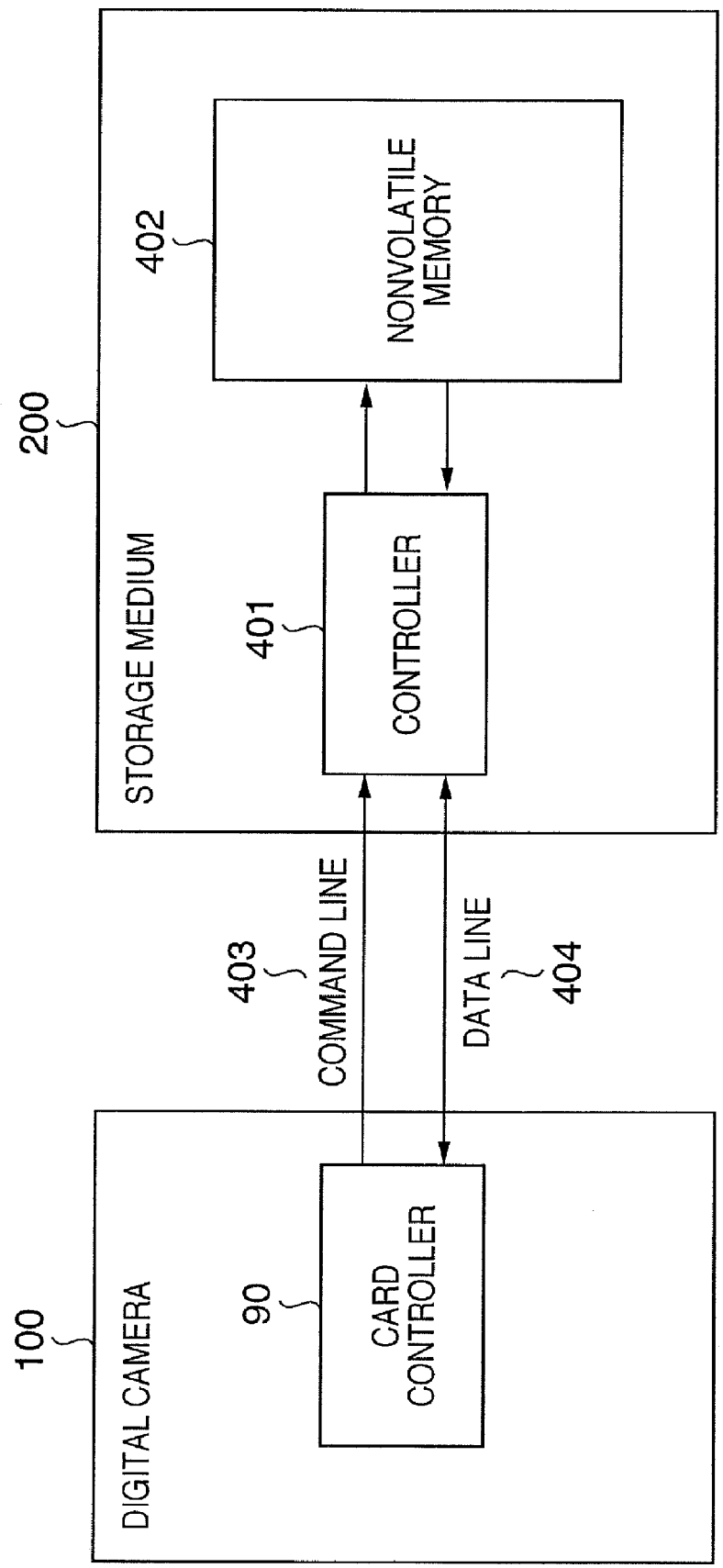
FIG. 6 is a block diagram showing an arrangement associated with communication between a storage medium 200 and a digital camera 100 in the embodiment of the present invention.

FIG. 6 is a block diagram showing an arrangement associated with communication between the storage medium 200 and the digital camera 100 in the embodiment. For the sake of convenience, the interface 91 and connector 92 are not illustrated in FIG. 6.

The storage medium 200 comprises a controller 401 and a nonvolatile memory 402. The controller 401 receives default commands from the card controller 90 in the digital camera 100 through a command line 403, and receives processed data through a data line 404. The controller 401 returns the processing result obtained by executing a received command to the card controller 90 through the data line 404.

The commands supplied from the card controller 90 include "WRITE_CMD" for writing data in the nonvolatile memory 402, "READ_CMD" for reading out data from the nonvolatile memory 402, "AVAILABLE_SECTOR_CMD" for requesting the number of writable sectors of the nonvolatile memory 402, and the like.

The controller 401 performs processing with respect to the nonvolatile memory 402 in accordance with the received command and processed data. The controller 401 manages the nonvolatile memory 402 as a logical address space and a physical address space, and stores a table showing the correspondence between the two spaces in the internal memory (not shown). The controller 401 then converts a logical space address received from the card controller 90 into a physical space address of the nonvolatile memory 402, and performs read/write operation or the like.

If the storage medium 200 is a limited-rewriteable storage medium, the storage medium 200 allows information to be written only once. If, therefore, the internal data of the storage medium 200 is changed, the data after the change is newly created. At this time, the controller 401 newly writes the changed data in the physical address space of the nonvolatile memory 402, and updates the correspondence between the logical address space and the physical address space in which the newly written data exists. This allows the card controller 90 to designate the same logical address as that of data before editing even with respect to data after editing, eliminating the necessity to be conscious of the physical address space of data.

Assume that the controller 401 has received the command "WRITE_CMD" and the processed data "0x20 (a logical space address of the nonvolatile memory 402), 0xAAA (write data)". In this case, first of all, the controller 401 converts the logical space address "0x20" into the physical space address "0x40" of the nonvolatile memory 402. The controller 401 then writes the data "0xAA" at the physical space address "0x40" of the nonvolatile memory 402, and returns information indicating the success/failure of write processing to the card controller 90 through the data line 404. Upon receiving the command "AVAILABLE_SECTOR CMD", the controller 401 returns the number of writable sectors in the nonvolatile memory 402 to the card controller 90 through the data line 404.

Note that the nonvolatile memory 402 is not limited to a semiconductor storage device such as a flash ROM, and may be a magnetic recording medium such as a hard disk or an optical recording device such as a CD-R or DVD.

(Calculation Processing for The Number of Writable Sectors of Limited-Rewriteable Storage Medium)

An example of a method of calculating the number of writable sectors of a limited-rewriteable storage medium will be described next with reference to FIGS. 7 and 8A to 8C.

Figure 7:
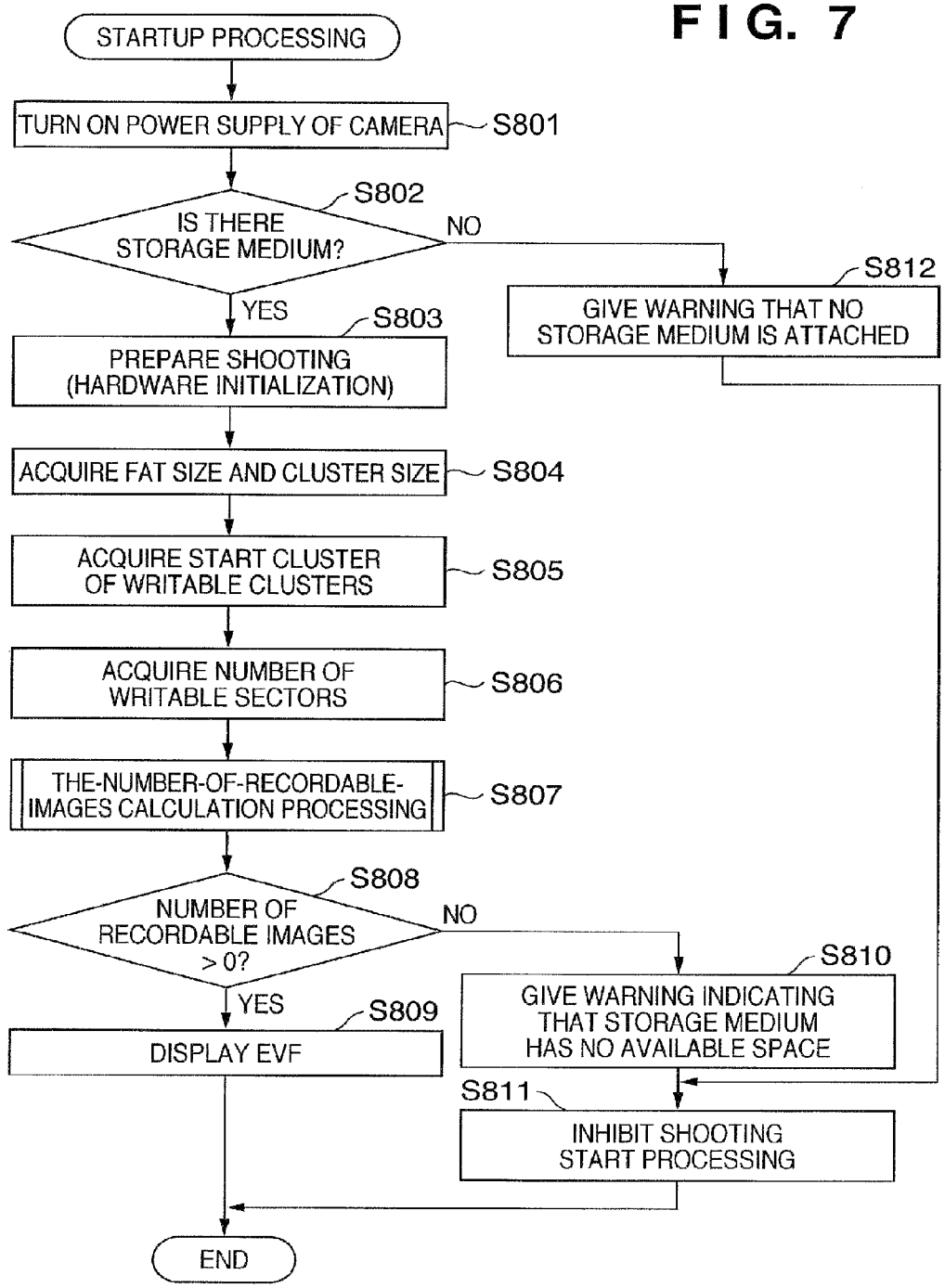
FIG. 7 is a flowchart for explaining processing at the startup of the digital camera 100 according to the first embodiment of the present invention.

FIG. 7 is a flowchart for explaining processing at the startup of the digital camera 100. Assume that in this embodiment, the shooting mode is set when the power supply is turned on.

First of all, the system control unit 50 starts operating upon power ON operation by the user (S801). The system control unit 50 determines through the storage medium detecting unit 98 whether the storage medium 200 is attached or detached (S802). Upon determining that the storage medium 200 is not attached ("NO" in step S802), the system control unit 50 displays a message indicating that the storage medium 200 is not attached on the image display unit 28, thereby giving a warning to the user (S812).

Figure 8A:
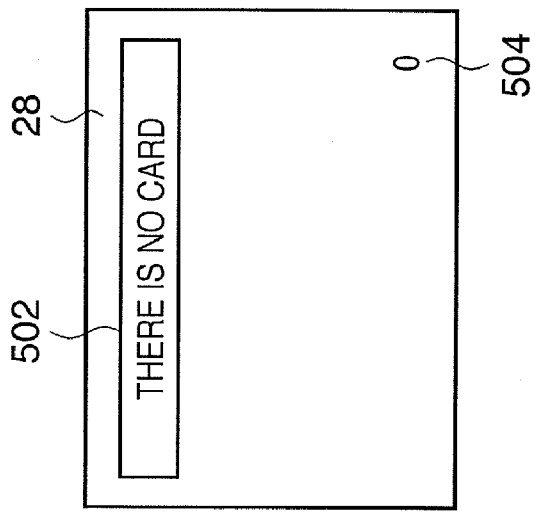
FIGS. 8A to 8C are views each showing an example of the window displayed on the digital camera 100 according to the first embodiment of the present invention.

FIG. 8A shows an example of the message displayed when the storage medium 200 is not attached. In this case, the apparatus displays "0" as the number of recordable images on the lower right portion in the window in addition to a message 502 "there is no card". Note that the apparatus may give a warning by a warning sound, synthetic speech, or the like other than a message indication. If the storage medium 200 is not attached, the apparatus does not permit shooting processing even if the user turns on the first shutter switch SW1 62 and second shutter switch SW2 64 (S811).

Upon determining that the storage medium 200 is attached ("YES" in step S802), the system control unit 50 supplies power to the respective units including the storage medium 200. The system control unit 50 initializes hardware, for example, causing the zoom control unit 44 to move the lens unit 10 to a predetermined position, thereby performing shooting preparation (S803).

The system control unit 50 acquires information concerning the file system of the storage medium 200, for example, the size of the FAT, a cluster size, and a sector size by analyzing the master boot record and boot sector of the storage medium 200, and stores them in the nonvolatile memory 56 (S804). The system control unit 50 also reads out FAT information from the storage medium 200, acquires the start position of writable clusters, and stores them in the nonvolatile memory 56 (S805).

The system control unit 50 causes the card controller 90 to transmit the command "AVAILABLE_SECTOR_CMD", and acquires the number of writable sectors of the nonvolatile memory 402 from the controller 401 of the storage medium 200 (S806). The system control unit 50 stores the number of writable sectors in the nonvolatile memory 56.

The system control unit 50 calculates the number of recordable images based on the number of writable sectors acquired in step S806 (S807). The the-number-of-recordable-images calculation processing will be described in detail later with reference to FIG. 10. The apparatus stores the calculation result in the nonvolatile memory 56.

In step S808, the system control unit 50 determines whether the number of recordable images calculated in step S807 is equal to or more than one, that is, the apparatus is ready for shooting. If the number of recordable images is equal to or more than one ("YES" in step S808), the system control unit 50 causes the image display unit 28 to function as an electronic viewfinder, and displays the calculated number 504 of recordable images (S809), as shown in FIG. 8C.

If management information has already been recorded in the storage medium 200, the system control unit 50 imports the management information into the internal memory, and updates the management information imported into the internal memory after shooting operation. Note that it suffices to import management information from the storage medium in use at another timing, for example, at the time of processing in step S804.

Upon determining that the number of recordable images is 0, that is, the apparatus is not ready for shooting ("NO" in step S808), the system control unit 50 gives a warning indicating that the storage medium 200 has no available space (S810).

Figure 8B:
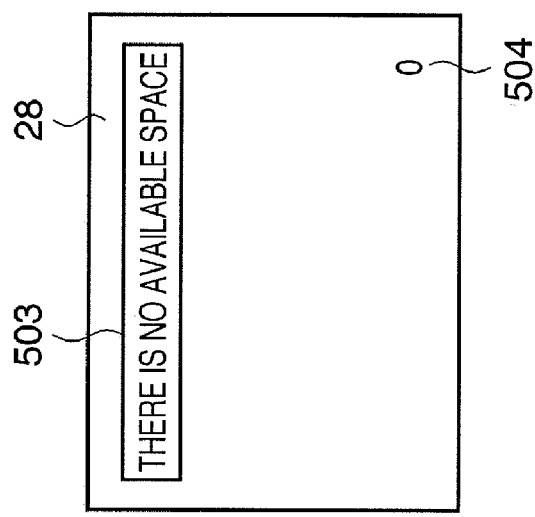
Figure 8C:
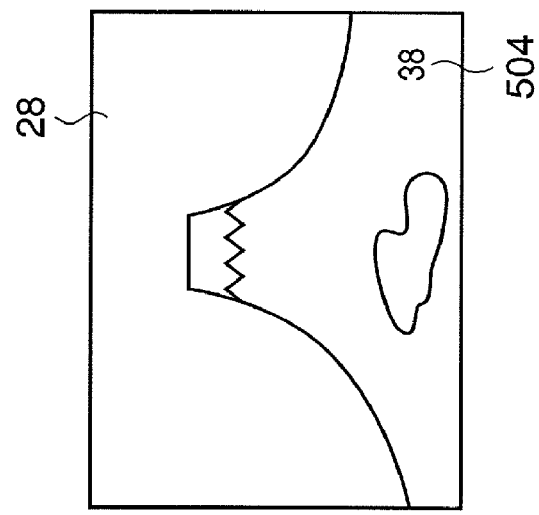

FIG. 8B shows an example of the message displayed when the storage medium 200 has no available space. In this case, "0" is displayed as the number 504 of recordable images on the lower right portion in the window in addition to a message 503 "there is no available space". Note that the apparatus may give a warning by a warning sound, synthetic speech, or the like other than a message indication. If the storage medium 200 has no available space and the number of recordable images is 0, the apparatus does not permit shooting processing even if the user turns on the first shutter switch SW1 62 and second shutter switch SW2 64 (S811).

Note that it is possible to execute the processing in step S803 and the subsequent steps in FIG. 7 when the image detects a storage medium at a timing other than the timing of startup. Assume that the user needs to remove the storage medium 200 while the image capturing apparatus is active and replace it with another storage medium. At this time, the system control unit 50 determines through the storage medium detecting unit 98 whether the storage medium 200 is attached. Upon determining that the storage medium 200 is attached, the storage medium 200 performs the processing in step S803 and the subsequent steps.

In this case, it suffices to initialize hardware corresponding to only a portion associated with the card function such as the card controller 90 and interface 91. It suffices to detect the attachment of the storage medium 200 by either an electrical method or mechanical method depending on the type of storage medium to be attached. Alternatively, it suffices to indirectly detect the attachment of a storage medium based on, for example, the opening/closing of a cover which is provided to protect a storage medium or its mount portion (e.g., a card slot).

Figure 9:
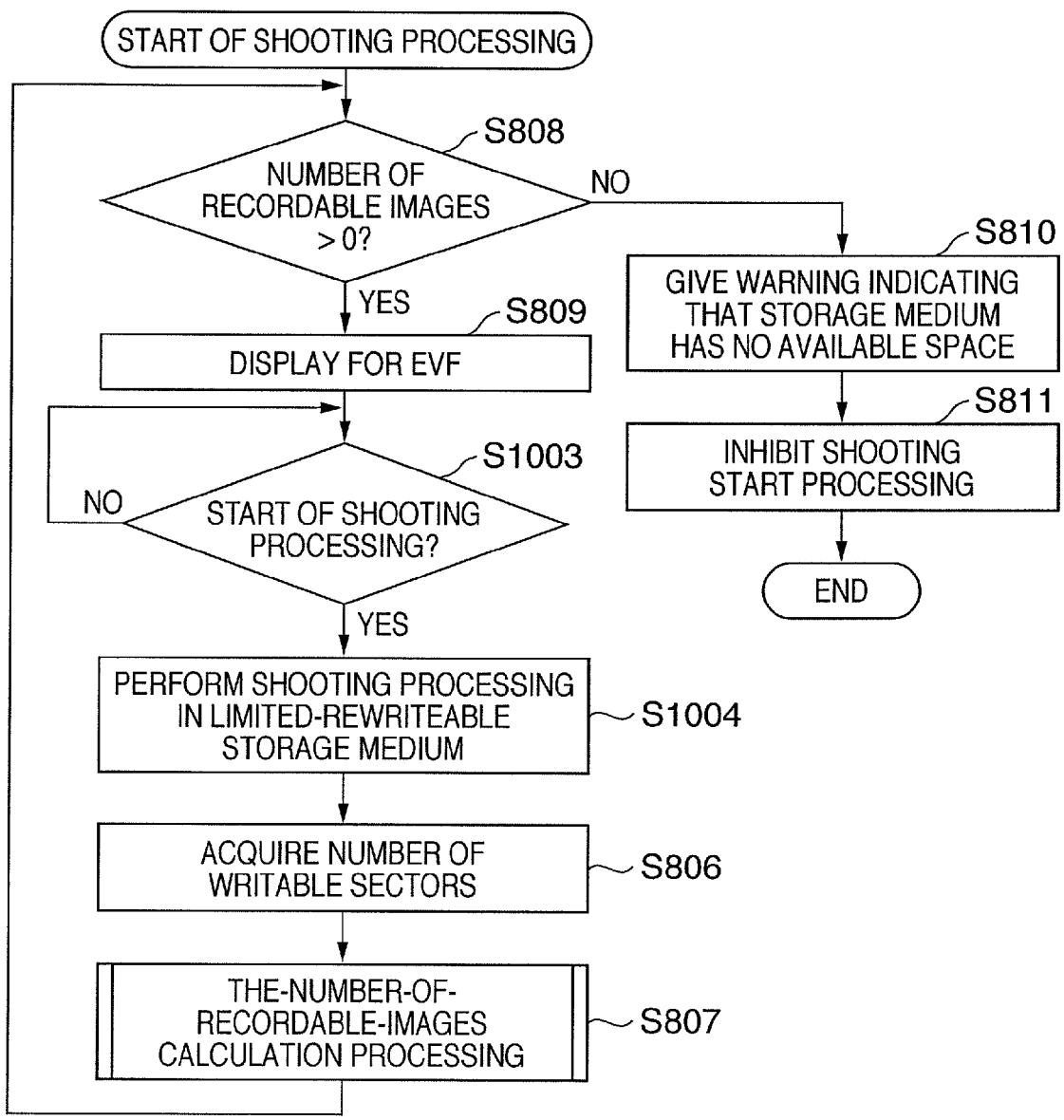
FIG. 9 is a flowchart for explaining shooting processing by the digital camera 100 according to the first embodiment of the present invention.

Shooting processing by the digital camera 100 according to this embodiment will be described next with reference to the flowchart shown in FIG. 9. The same reference numerals as in FIG. 9 denote steps of performing the same processing in FIG. 7.

First of all, as in the case of startup processing, the system control unit 50 determines based on the number of recordable images whether the apparatus is ready for shooting (S808). If the number of recordable images is equal to or more than one ("YES" in step S808), the system control unit 50 causes the image display unit 28 to function as an electronic viewfinder, and displays the calculated number of recordable images (S809).

The system control unit 50 is set in a standby state for waiting for a shooting start instruction from the user (S1003). In this case, when the user fully presses the shutter button and turns on the second shutter switch SW2 64, the system control unit 50 determines that a shooting processing start instruction is input.

In response to the shooting processing start instruction, the system control unit 50 performs shooting processing and write processing with respect to a limited-rewriteable storage medium (S1004). Note that the processing in step S1004 is the same as that in steps S605 to S611 in FIG. 5.

The system control unit 50 acquires the number of writable sectors from the storage medium 200 (S806), and calculates the number of recordable images (S807). The system control unit 50 determines based on the number of recordable images calculated in step S807 whether the apparatus can perform next shooting (S808).

Figure 10:
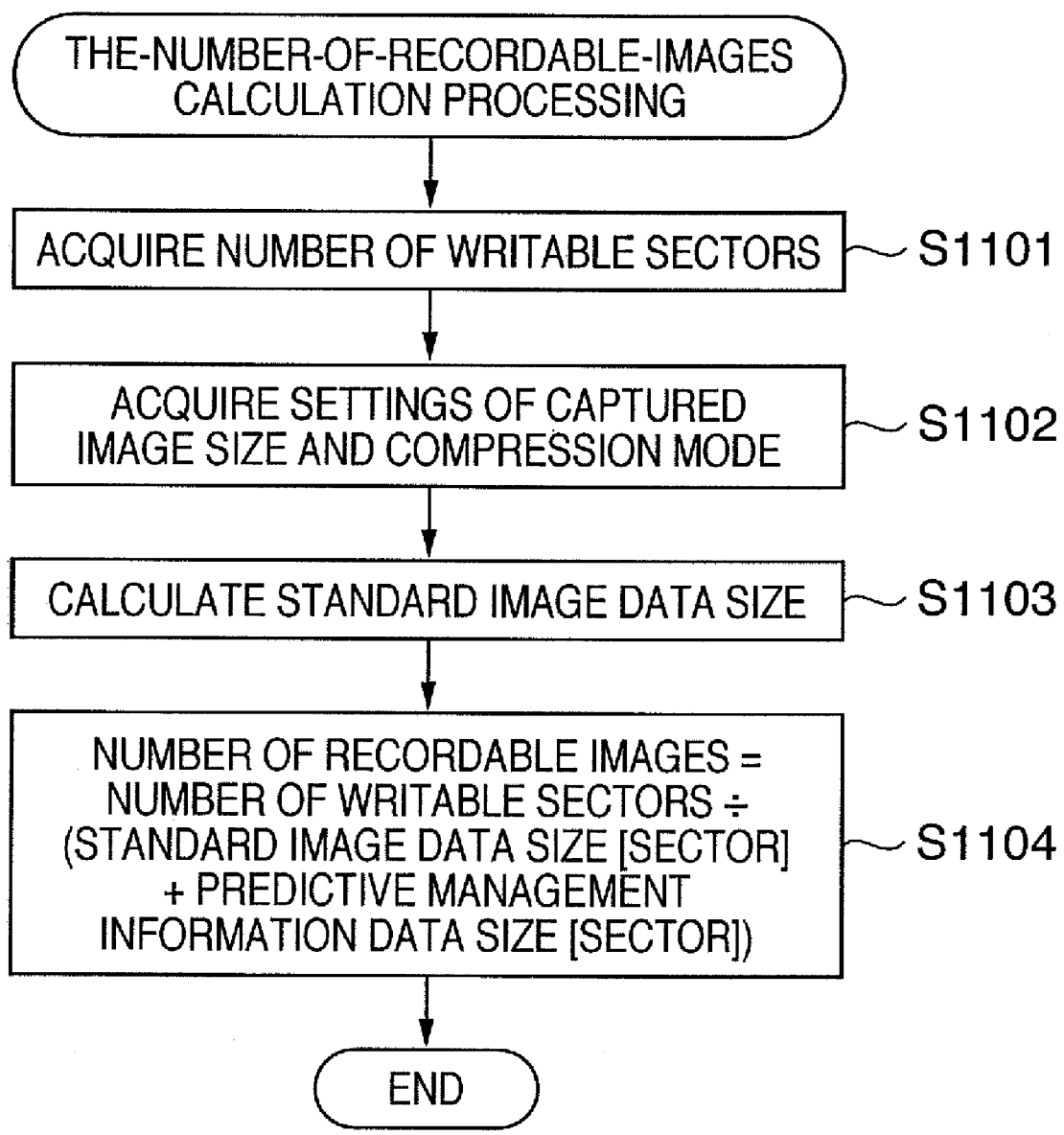
FIG. 10 is a flowchart for explaining calculation processing for the number of recordable images by the digital camera 100 according to the first embodiment of the present invention.

The-number-of-recordable-images calculation processing by the digital camera 100 according to this embodiment will be described next with reference to the flowchart shown in FIG. 10.

First of all, the system control unit 50 reads out the number of writable sectors acquired in step S806 from the nonvolatile memory 56 (S1101). The system control unit 50 acquires the size (the number of pixels) of a captured image and the compression mode (quality), which the user have set in advance, from the nonvolatile memory 56 (S1102), and calculates a standard image data size corresponding to a set condition (S1103). In this case, it suffices to use any calculation method for a standard image data size. For example, it suffices to calculate a standard image data size by applying an image size and a compression mode to a prepared mathematical expression. The apparatus may acquire a standard image data size by preparing a two-dimensional table in advance, which receives an image size and a compression mode as inputs, and outputs a standard image data size, and referring to the table. Note that a data size is obtained as the number of sectors to be used.

According to the JPEG scheme as a compression coding scheme generally used in an image capturing apparatus, a data size after compression changes in accordance with the characteristics of an original image even if the same encoding parameters are used. For this reason, the standard image data size used for the calculation of the number of writable images is set to a relatively large value to allow even an image with a relatively low compression ratio to be recorded.

The system control unit 50 calculates the number of recordable images by dividing the number of writable sectors read out from the nonvolatile memory 56 by the sum of the standard image data size (sector unit) and a predetermined management information data size (sector unit) (S1104). In this embodiment, although a predetermined management information size is set to a size of three sectors which is a necessary minimum value for updating two FATs and one directory entry sector, a larger number of sectors may be set to allow reliable writing. In this case, the number of recordable images is calculated on the assumption of the most inefficient state, that is, the state wherein management information is recorded every time an image is captured.

As has been described above, according to this embodiment, when a limited-rewriteable storage medium with a limited number of write accesses is to be used, it is possible to suppress the number of writes of management information by using the internal memory with a small capacity. This makes it possible to efficiently use the storage capacity. In addition, it is possible to accurately calculate the available space of a limited-rewriteable storage medium.

Second Embodiment

Figure 11A:
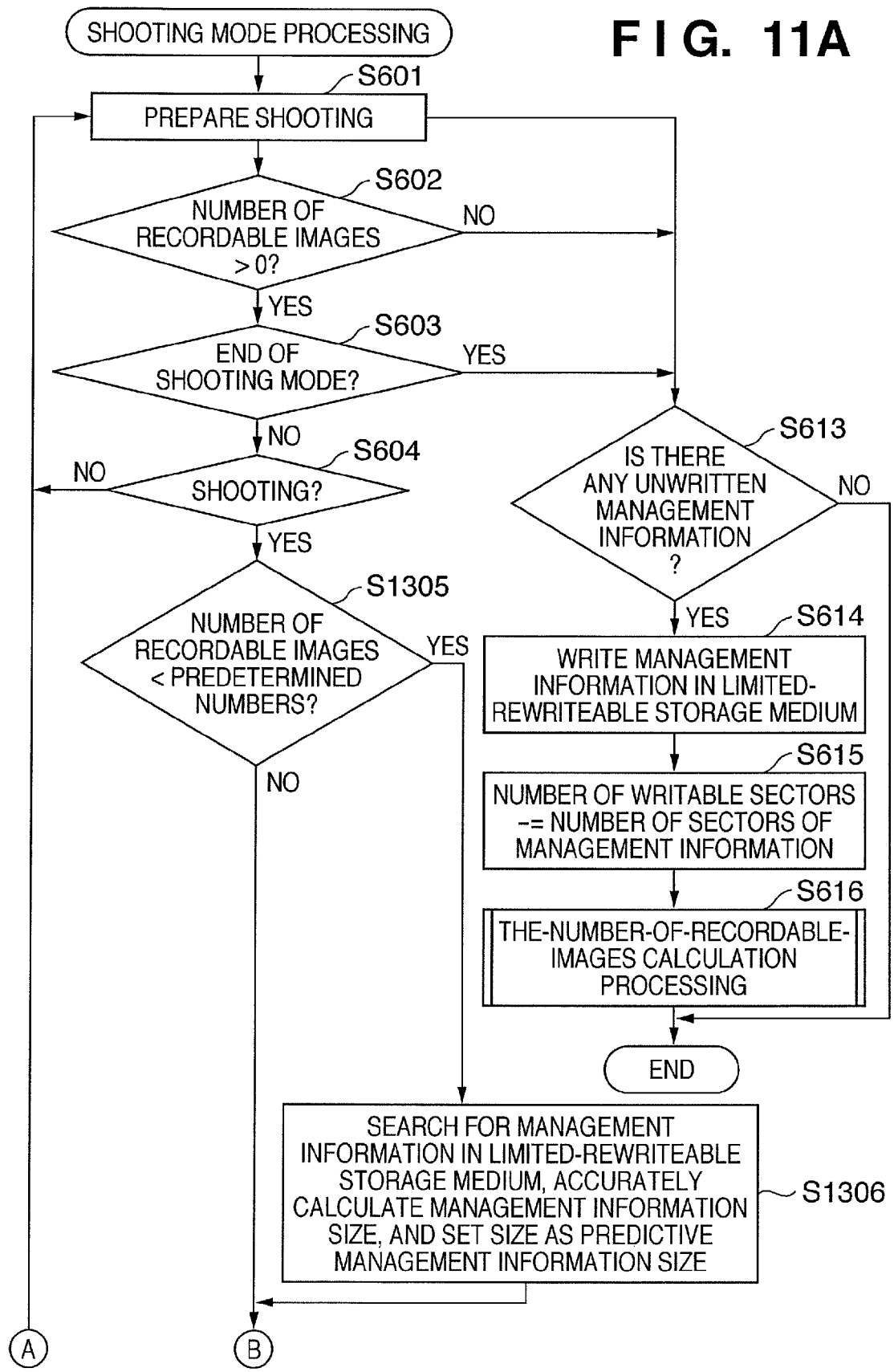
FIGS. 11A and 11B are flowcharts for explaining shooting mode processing in an image capturing apparatus according to the second embodiment of the present invention.
Figure 11B:
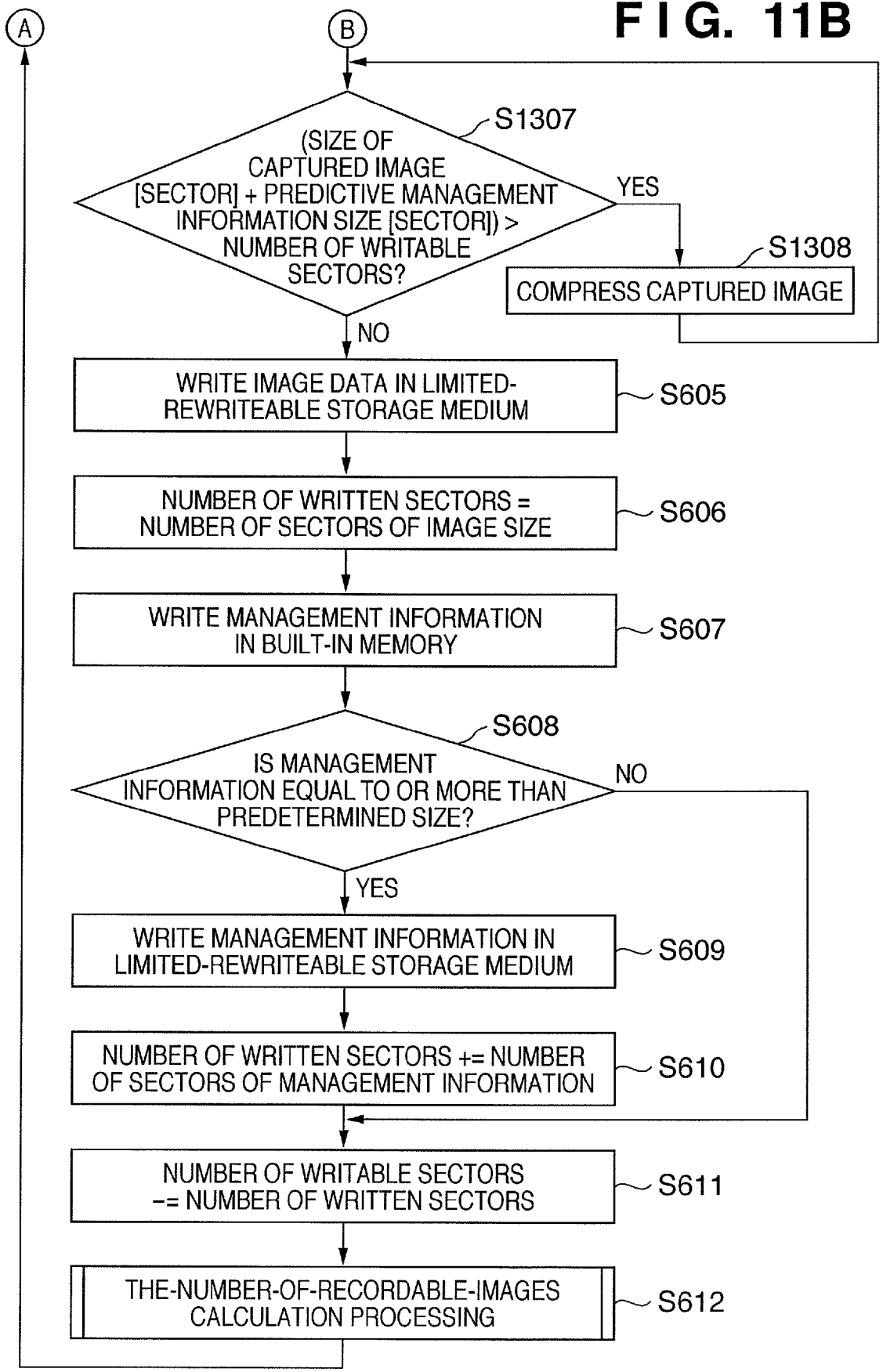

Shooting mode processing in an image capturing apparatus according to the second embodiment of the present invention will be described next with reference to the flowcharts shown in FIGS. 11A and 11B. The arrangement of the image capturing apparatus according to this embodiment may be common to that of the digital camera 100 described in the first embodiment, and hence a description will be omitted. The same reference numerals as in FIGS. 11A and 11B denote steps of performing the same processing as the shooting mode processing (FIG. 5) in the first embodiment, and a description will be omitted.

Since the shooting mode processing in this embodiment differs from that in the first embodiment in the processing from step S1305 to step S1308, only different processing will be described below.

Upon detecting the input of a shooting start instruction ("YES" in FIG. 604), a system control unit 50 determines whether the number of recordable images is smaller than a predetermined number of images (S1305). In this case, the predetermined number of images is two. There are differences between a standard image data size as a predictive value and an actual data size and between a predictive management information data size and an actual data size. As a consequence, as the available space of a storage medium 200 decreases, the actual number of writable images may become smaller than the number of recordable images based on a predictive value. Grasping an accurate management information data size when the number of recordable images based on a predictive value decreases to a certain value makes it possible to suppress a situation in which images cannot be written.

Upon determining that the number of recordable images is smaller than the predetermined number of images ("YES" in step S1305), the system control unit 50 searches for management information in the limited-rewriteable storage medium. The system control unit 50 then accurately calculates the size of management information which needs to be written later, and sets the calculated size as a predictive management information size (S1306).

Upon determining that the number of recordable images is larger than the predetermined number of images (NO in step S1305), the system control unit 50 does not perform the processing in step S1306.

In step S1307, the system control unit 50 determines whether the sum (write data size [sector]) of the image data size [sector] generated by shooting processing and the predictive management information data size [sector] is larger than the number of writable sectors.

Upon determining that the write data size [sector] is larger than the number of writable sectors, the system control unit 50 performs compression processing to reduce the image data size (S1308). The system control unit 50 then performs determination in step S1307 again. The system control unit 50 repeatedly performs compression processing until the writable data size [sector] becomes equal to or less than the number of writable sectors.

If the write data size [sector] is equal to or less than the number of writable sectors, the system control unit 50 performs the image data write processing in step S605 and the subsequent processing. This makes it possible to reliably write management information.

Other Embodiments

The above embodiments have exemplified the case wherein a write-once storage medium is used as a limited-rewriteable storage medium. However, the present invention can be applied to any storage medium with a limited number of write accesses in a state wherein no rewrite operation can be performed.

The above embodiments have exemplified management information for image data as data to be written in storage medium. However, the above recording control can be applied to arbitrary data (write-once data) to be written in a limited-rewriteable storage medium. That is, write-once data is written in a limited-rewriteable storage medium after the data is temporarily stored in the internal memory and the contents of the data are determined. In this case as well, recording data for each size equal to the recording unit of a limited-rewriteable storage medium makes it possible to further efficiently use the storage capacity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-240795, filed on Sep. 5, 2006, which is hereby incorporated by reference herein in its entirety.

The invention claimed is:

1. An image capturing apparatus, comprising:
   a holder unit which allows a storage medium to be attached/detached;
   a discrimination unit adapted to determine whether a storage medium attached to said holder unit is a limited-rewriteable storage medium;
   a built-in storage unit which is rewriteable; and
   a write control unit adapted to: (a) when said discrimination unit determines that the storage medium is a limited-rewriteable storage medium, perform control to write image data generated by shooting processing in the storage medium, while temporarily saving management information for the image data in said built-in storage unit and writing the management information in the storage medium every time the management information reaches a predetermined data size; and (b) when said discrimination unit determines that the storage medium is not a limited-rewriteable storage medium, perform control to write both image data generated by shooting processing in a shooting mode and the management information in the storage medium before the management information reaches the predetermined data size.

2. The apparatus according to claim 1, wherein the predetermined data size is equal to a size of a minimum writing unit of the storage medium.

3. The apparatus according to claim 1, wherein the predetermined data size is equal to a buffer size ensured in said built in built-in storage unit.

4. The apparatus according to claim 1, wherein the limited-rewriteable storage medium is a storage medium having write-once ability per storage sector.

5. A method comprising:
   determining whether a storage medium attached to a holder unit, which holder unit allows a storage medium to be attached/detached, is a limited-rewriteable storage medium;
   when it is determined that the storage medium is a limited-rewriteable storage medium, performing control to write image data generated by shooting processing in the storage medium, while temporarily saving management information for the image data in a built-in storage unit that is rewriteable and writing the management information in the storage medium every time the management information reaches a predetermined data size; and
   when it is determined that the storage medium is not a limited-rewriteable storage medium, perform control to write both image data generated by shooting processing in a shooting mode and the management information in the storage medium before the management information reaches the predetermined data size.

* * * * *